(12) United States Patent
Tougeron et al.

(10) Patent No.: US 6,289,815 B1
(45) Date of Patent: Sep. 18, 2001

(54) DEVICE FOR CONTROLLING BIRD STRIKE HAZARDS

(75) Inventors: Raymond Tougeron, Pamiers; Daniel Casenave, Castanet, both of (FR)

(73) Assignee: Etienne Lacroix Tous Artifices S.A., Muret (FR)

(*) Notice: Subject to any disclaimer, the term of this patent is extended or adjusted under 35 U.S.C. 154(b) by 0 days.

(21) Appl. No.: 09/202,327
(22) PCT Filed: Jun. 11, 1997
(86) PCT No.: PCT/FR97/01047
§ 371 Date: Apr. 13, 1999
§ 102(e) Date: Apr. 13, 1999
(87) PCT Pub. No.: WO97/47191
PCT Pub. Date: Dec. 18, 1997

(30) Foreign Application Priority Data

Jun. 14, 1996 (FR) .................................. 96 07459

(51) Int. Cl.⁷ .................. F42B 4/04; F42B 14/06
(52) U.S. Cl. .................. 102/302; 102/336; 102/361; 102/502
(58) Field of Search .................. 102/302, 336, 102/361, 502

(56) References Cited

U.S. PATENT DOCUMENTS

| | | | |
|---|---|---|---|
| 926,457 | * 6/1909 | Behr | 102/361 |
| 2,247,111 | * 6/1941 | Batchelor et al. | 102/502 X |
| 2,961,962 | * 11/1960 | Jackson | 102/336 |
| 3,584,582 | * 6/1971 | Muller | 102/512 |
| 3,782,286 | * 1/1974 | Jones et al. | 102/502 |
| 4,052,940 | * 10/1977 | Gits et al. | 102/361 |
| 4,457,233 | * 7/1984 | Hyde | 102/346 |
| 4,566,388 | * 1/1986 | Loyd, Jr. | 102/361 |
| 5,025,725 | * 6/1991 | Cameron | 102/361 X |
| 5,801,321 | * 9/1998 | LaGrange et al. | 102/336 |

FOREIGN PATENT DOCUMENTS

| | | |
|---|---|---|
| 279298 | 11/1951 | (CH) . |
| 85 06 299 | 5/1985 | (DE) .................. F24B/7/04 |
| 701888 | 3/1931 | (FR) . |

* cited by examiner

*Primary Examiner*—Peter A. Nelson
(74) *Attorney, Agent, or Firm*—Sughrue, Mion, Zinn, Macpeak & Seas, PLLC

(57) ABSTRACT

A device for dispersing birds in airport areas, including a self-propelled projectile with a delayed firing element (15, 18, 27, 29) and a sound-effect charge (9) designed to scare birds away and housed in said projectile.

13 Claims, 2 Drawing Sheets

DEVICE FOR CONTROLLING BIRD STRIKE HAZARDS

BACKGROUND OF THE INVENTION

The invention relates to means for dispersing birds in airport regions.

Birds are a real nuisance to airports. They cause considerable delays or even accidents on take-off if they are ingested into an aircraft jet engine running at full power. Combating the threat posed by birds is therefore a major problem to airports.

There are known, for example, electronic systems installed near the take-off and landing strips, which emit signals at frequencies likely to scare the birds by imitating the cries of predators. However, birds living close to the airport become accustomed to these electronic systems which therefore become ineffective.

Elsewhere, use is also made of conventional hunting cartridges. The drawback of this means lies in the fact that the hunting cartridge is only low range, about 50 m, and that it is noisy at the start of the shot. The birds can therefore locate the firing device by the noise at the beginning of the firing and keep away from it without actually vacating the at-risk areas of the airport.

At lightly used airports, use is also made of specially trained falcons from falconries in order to keep birds away from the airport. However, this technique of combating the threat caused by birds cannot be applied to airports where the aerial traffic is intense.

SUMMARY OF THE INVENTION

The invention aims to alleviate these drawbacks by creating an acoustic-effect pyrotechnic device intended to scare birds over some distance, and which has no acoustic signature at the start.

To this end, the subject of the invention is a pyrotechnic device for combating the threat caused by birds, characterized in that it consists of a self-propelled projectile containing a propulsion motor and an element for the delayed ignition of an acoustic-effect charge intended to scare birds and which is housed in the said projectile.

BRIEF DESCRIPTION OF THE DRAWING

Other features and advantages of the invention will become clear from the following description which is given by way of non-limiting example, with reference to the appended drawing, in which.

DETAILED DESCRIPTION OF THE DRAWINGS

Figure 1:
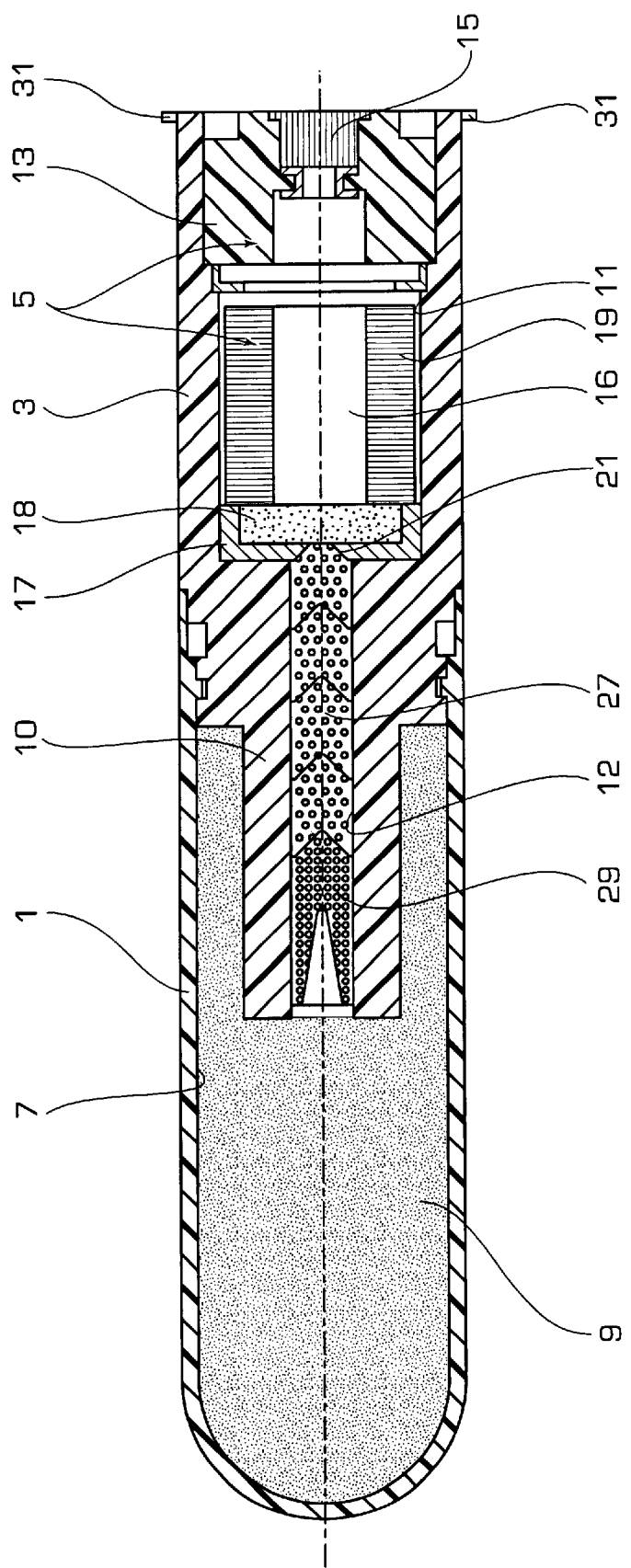
FIG. 1 is a view in longitudinal section of a pyrotechnic device against the threat caused by birds, according to the invention.

FIG. 1 depicts a pyrotechnic device for combating the threat caused by birds according to the invention, comprising a case 1 of cylindro-ogival shape connected by its open end to a base 3 comprising a motor 5.

The case 1 and the base 3 delimit a housing 7 containing an acoustic-effect charge 9 intended to scare birds.

The base 3 has a cylindrical overall external shape and on the same side as the housing 7 has a smaller diameter cylindrical extension 10 which project into this housing 7 and is surrounded by the acoustic-effect charge 9.

The base 3 also comprises, on the opposite side to the extension 10, an axial well 11 in which the motor 5 is housed, and an axial duct 12 intended to house a composition for the delayed ignition of the acoustic effect charge 9. This duct 12 extends through the extension 10 to open at one end into the housing 7 and at its other end communicates with the axial well 11.

The motor 5 comprises a nozzle 13 housed at the opposite end of the well 11 to the extension 10 and fixed into the base 3 by crimping, bonding or screwing. This nozzle 13 comprises a percussion or electric detonator 15, depending on the type of launcher used.

Delimited between the nozzle 13 and the end of the well 11 close to the extension 10 is a combustion chamber 16 which communicates on the nozzle 13 side with the detonator 15. The opposite end of the well 11 to the detonator 15 accommodates a dish 17 containing a composition 18 for initiating the motor 5. Radially, the combustion chamber 16 is delimited by a solid propellant 19 in the form of a hollow cylinder in contact with the initiation composition 18.

Furthermore, the end of the dish 17 has a hole 21 at its centre.

The delayed-ignition composition consists of a pyrotechnic delay 27 which fills the duct 12 over more or less three-quarters of its length and which is in contact with the initiation composition 18 through the hole 21.

In the continuation of the pyrotechnic delay 27 and in contact therewith, an ignition composition 29 fills the remaining quarter of the duct 12. On its other side, close to the acoustic-effect charge 9, it is produced in the form of a firing space conventionally used in pyrotechnics.

Advantageously, the case 1, the base 3 and the nozzle 13 are made of plastic, for example of the filled polyethylene type (PA 6.6) or of the polypropylene type, so as not to damage the blades of a jet engine should the debris of such a projectile accidentally be ingested into an aircraft jet engine.

The projectile according to the invention is intended to be fired from an individual weapon, for example a pistol of calibre 4 fitted with a reducing adapter or from a launcher that has a barrel suited to the calibre of the projectile and is long enough to provide the projectile with good guidance, and a device for firing the detonator 15. For this, the base 3, at its end that bears the nozzle 13, has two lateral studs 31 made of plastic which hold the projectile in the launcher used.

The pyrotechnic device for combating the threat caused by birds according to the invention works as follow. When firing from a launcher designed for this purpose, first of all the detonator 15 is initiated. This initiation brings about ignition by projecting the fire from the detonator through the combustion chamber 16 to the initiation composition 18 which in turn ignites the propellant 19 and the pyrotechnic delay 27.

Under the effect of the thrust obtained by the combustion of the propellant 19, the studs 31 are broken and release the projectile which is propelled with a ballistic trajectory predetermined by the firer. As the pyrotechnic device travels, the pyrotechnic delay 27 is burnt up during a predetermined time until it in turn initiates the ignition composition 29 which finally causes the acoustic-effect charge 9 to explode. Through the acoustic effect of the deflagration, the birds towards which the projectile was fired are dispersed.

Advantageously, the quantities of pyrotechnic delay 27 and of propellant 19 are determined such that the pyrotechnic delay 27 initiates the acoustic-effect charge 9 via the ignition composition 29.

The range of such a pyrotechnic device may be as much as 400 meters, depending on the amount of propellant.

By virtue of the propulsion motor, the launch of the projectile is not audible from a distance and cannot therefore be located early on by the birds. In consequence, the exploding of the acoustic-effect charge has an effect of surprise on the birds which can therefore effectively be driven away from the at-risk areas of the airport.

Figure 2:
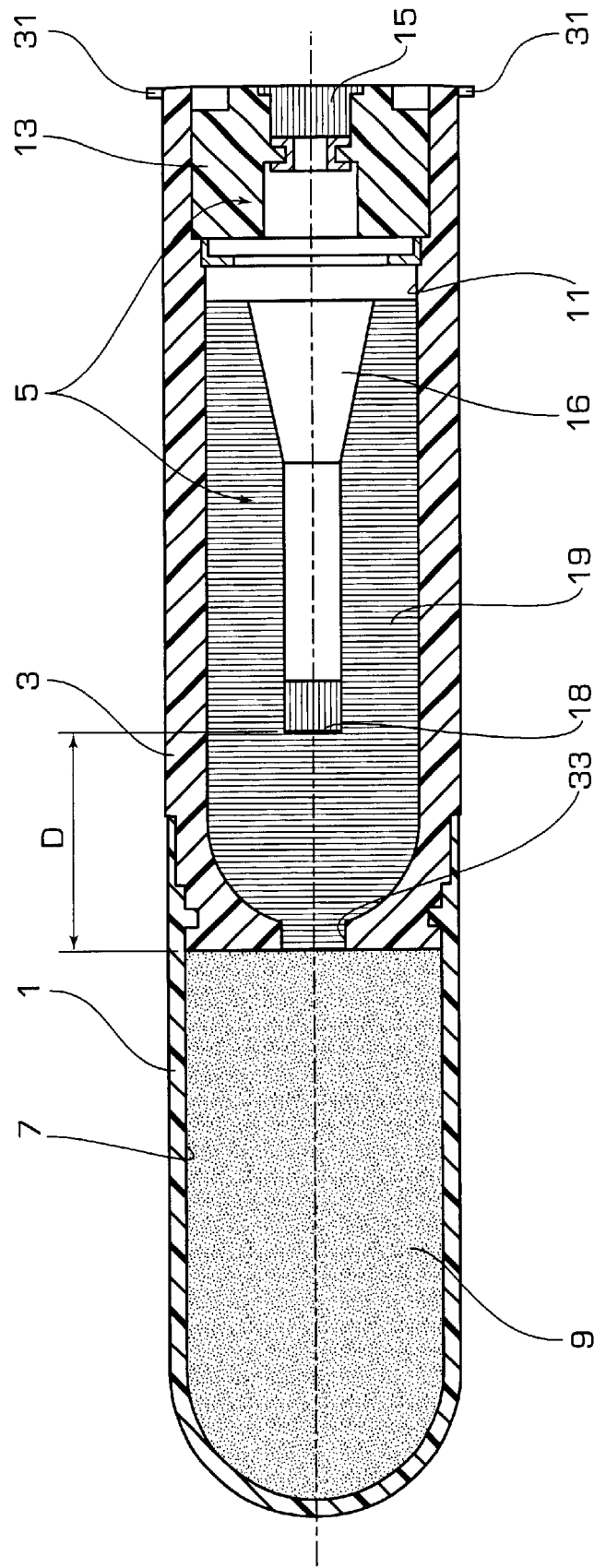
FIG. 2 is a view in longitudinal section of an alternative form of the pyrotechnic device according to the invention.

FIG. 2 presents an alternative form of pyrotechnic device for combating the threat caused by birds. Those elements which correspond to those of the pyrotechnic device depicted in FIG. 1 have been denoted by the same reference numerals.

This alternative form can be differentiated from the pyrotechnic device depicted in FIG. 1 in that the propulsive charge 19 itself forms the element for delayed ignition of the acoustic-effect charge 9.

To this end, the axial well 11 of the base 3 is longer than the one in FIG. 1 and, at the same end as the acoustic-effect charge 9, has a cylindro-ogival shape. This axial well 11 communicates by the opposite end to the nozzle 13 with the housing 7 containing the acoustic-effect charge 9 by a passage 33. Incidentally, the base 3 in the alternative form has no extension projecting into the housing 7.

According to the alternative form, the solid propellant 19 hugs the wall of the base delimiting the axial well 11, and is in contact with the acoustic-effect charge 9 through the passage 33. The solid propellant 19 is hollowed at its centre at the same end as the nozzle 13 to approximately three-quarters of the way along its length, thus forming an elongate combustion chamber 16. At the opposite end of the chamber 16 to the nozzle there is a composition 18 for initiating the propellant 19, for example an ignition enhancer. It will thus be understood that the axial well 11 in its cylindro-ogival-shaped part that lies between the initiation composition 18 and the passage 33 is completely filled with propellant 19.

The way in which the pyrotechnic device depicted in FIG. 2 works is similar to the operation of the pyrotechnic device depicted in FIG. 1.

In effect, when firing from a launcher designed for this purpose, first of all the detonator 15 is initiate his initiation brings about ignition by projecting the fire from the detonator through the combustion chamber 16 to the initiation composition 18 which in turn ignites the propellant 19.

Under the effect of the thrust obtained by the combustion of the propellant 19, the studs 31 are broken and release the projectile which is propelled in the direction of a region at which the gunner is aiming. As the pyrotechnic device travels, the propellant 19 is burnt up. When the propellant 19 that lies between the initiation composition 18 and the surface for contact with the acoustic-effect charge 9 has been burnt up, the acoustic-effect charge 9 is initiated in turn and explodes. Thus, the birds towards which he projectile was fired are dispersed.

It will be understood that the delay between launching the pyrotechnic device and the exploding of the acoustic-effect charge 9 is determined by the distance D between the initiation composition 18 and the propellant/acoustic-effect charge contact surface.

What is claimed is:

1. A pyrotechnic device for combating the threat caused by birds, characterized in that it consists of a self-propelled projectile containing a detonator, a propulsion motor (5) initiated directly by the detonator and an element for the delayed ignition of an acoustic-effect charge (9) intended to scare birds and which is housed in said projectile, said delayed-ignition element comprising a pyrotechnic delay (27) arranged between the propulsion motor (5) and the acoustic-effect charge (9) and a device (15, 18) for initiating said pyrotechnic delay (27).

2. Pyrotechnic device against the threat caused by birds according to claim 1, characterized in that the delayed-ignition element is formed by a propulsive charge (19) of the propulsion motor (5) and in that the pyrotechnic device comprises a device (15, 18) for initiating the propulsive charge (19).

3. Pyrotechnic device against the threat caused by birds according to claim 2, characterized in that the initiation device (15, 18) of the motor (5) comprises the detonator (15) contained in a nozzle (13) of the motor and communicating with an initiation composition (18) through a combustion chamber (16) of the motor (5) which combustion chamber is formed in the propulsive charge (19), the said initiation composition (18) being in contact with the propulsive charge (19).

4. Pyrotechnic device against the threat caused by birds according to claim 3, characterized in that the propulsion motor (5) is housed in an axial well (11) of a base (3), one end of which axial well (11) communicates through a passage (33) with a housing (7) formed by a case (1) connected to the base (3) and containing the acoustic-effect charge (9), and the other end of which well houses the nozzle (13) fixed into the base (3), and in that the propulsive charge (19) of the motor (5) is in contact with the acoustic-effect charge (9) through the passage (33).

5. Pyrotechnic device against the threat caused by birds according to any one of claim 4, characterized in that the nozzle (13), the base (3) and the case (1) are all made of plastic.

6. Pyrotechnic device against the threat caused by birds according to claim 1, characterized in that the pyrotechnic delay (27) is arranged in a duct (12) formed in a base (3) housing the propulsion motor (5) and in that the initiation device (15, 18) also forms the device that initiates the propulsion motor (5).

7. Pyrotechnic device against the threat caused by birds according to claim 6, characterized in that the duct (12) extends axially into the base (3) and into an extension (10) thereof which projects into a housing (7) formed by a case (1) connected to the base (3) and containing the acoustic-effect charge (9).

8. Pyrotechnic device against the threat caused by birds according to either of claim 7, characterized in that the device (15, 18) for initiating the pyrotechnic delay and the motor (5) comprises the detonator (15) contained in a nozzle (13) of the motor (5) and communicating with an initiation composition (18) through a combustion chamber (16) of the motor (5), the initiation composition (18) being in contact with a propulsive charge (19) of the motor (5) and the pyrotechnic delay (27).

9. Pyrotechnic device against the threat caused by birds according to any one of claim 8, characterized in that an ignition composition (29) is inserted between the pyrotechnic delay (27) and the acoustic-effect charge (9) in the said duct (12).

10. Pyrotechnic device against the threat caused by birds according to either of claim 9, characterized in that the propulsion motor (5) is housed in an axial well (11) made in the base (3) and communicating with the duct (12) via its end close to the extension (10), the said end of the well housing a dish (17) containing the initiation composition (18) in contact with the pyrotechnic delay (27) through a hole (21) located in the bottom of the dish (17), the propulsive charge (19), in the form of a hollow cylinder and radially delimiting the combustion chamber (16), being partially in contact with the initiation composition (18), the nozzle (13) being housed at the opposite end of the well (11) to the extension (10) and being fixed into the base (3).

11. Pyrotechnic device against the threat caused by birds according to claim 10, characterized in that the nozzle (13), the base (3) and the case (1) are all made of plastic.

12. Pyrotechnic device against the threat caused by birds according to claim 8, characterized in that the nozzle (13), the base (3) and the case (1) are all made of plastic.

13. Pyrotechnic device against the threat caused by birds according to claim 9, characterized in that the nozzle (13), the base (3) and the case (1) are all made of plastic.

* * * * *